United States Patent [19]

Victor

[11] Patent Number: 5,333,661
[45] Date of Patent: Aug. 2, 1994

[54] VEHICLE WHEEL WITH A RIM

[75] Inventor: Carl-Gustav B. C. Victor, Höllviksnäs, Sweden

[73] Assignee: Trelleborg Tyre Aktiebolag, Trelleborg, Sweden

[21] Appl. No.: 966,088

[22] Filed: Oct. 26, 1992

[30] Foreign Application Priority Data

Nov. 1, 1991 [SE] Sweden .............. 9103256-5

[51] Int. Cl.⁵ .................. B60C 15/024; B60B 21/10
[52] U.S. Cl. ..................... 152/379.3; 152/381.4
[58] Field of Search ......... 152/379.3, 379.4, 379.5, 152/384, 381.3, 381.4, 384

[56] References Cited

U.S. PATENT DOCUMENTS

| | | | |
|---|---|---|---|
| 3,915,215 | 10/1975 | Nebout | 152/379 |
| 4,034,792 | 7/1977 | Martin | 152/379 |
| 4,321,957 | 3/1982 | Hahn et al. | 152/362 |
| 4,351,382 | 9/1982 | Corner et al. | 152/330 RF |
| 4,878,527 | 11/1989 | Noma | 152/379.3 |
| 4,940,069 | 7/1990 | Nakaski et al. | 152/379.3 X |
| 5,070,921 | 12/1991 | Wada et al. | 152/379.5 X |
| 5,145,536 | 9/1992 | Noma et al. | 152/379.3 X |

FOREIGN PATENT DOCUMENTS

| | | |
|---|---|---|
| 0410672 | 1/1991 | European Pat. Off. . |
| 3402243 | 7/1985 | Fed. Rep. of Germany ... 152/381.3 |
| 3924600 | 1/1991 | Fed. Rep. of Germany . |
| 8008567 | 1/1985 | Sweden . |

Primary Examiner—Russell D. Stormer
Attorney, Agent, or Firm—Nils H. Ljungman & Associates

[57] ABSTRACT

A vehicle wheel comprises a wheel rim and a pneumatic tire fitted to the rim, particularly a tubeless tire wherein the wheel rim includes seats for the tire beads. The rim seats include an elevated ridge which is spaced from the rim flanges and the tire beads have a generally corresponding configuration. With the tire fitted to the rim, the bead cores of the tire are located between the rim flanges and the elevated ridge. According to the invention, the rim is a 15° rim with a 15° seat surface between the rim flange and the elevated ridge. The side of the elevated ridge remote from the rim flanges extends at an angle of 15°–40° essentially in a straight line from the crown of the elevated ridge in a direction inwards towards the rim center. The invention also relates to a wheel rim having rim seats and elevated ridges of the same configuration.

17 Claims, 3 Drawing Sheets

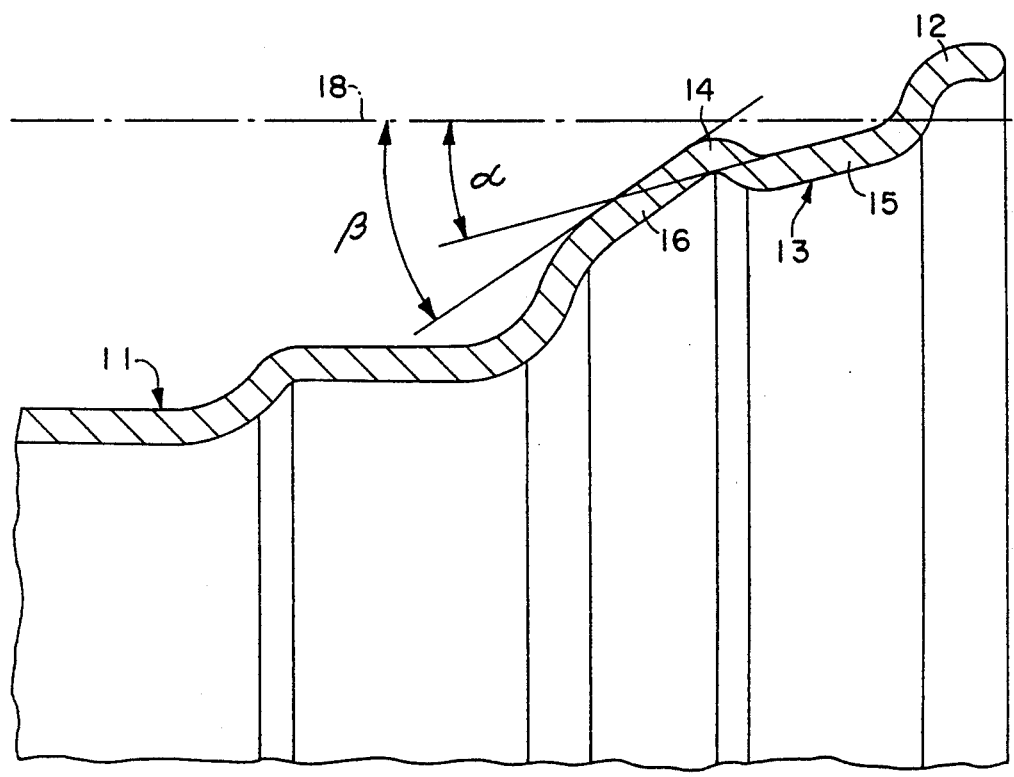
F I G. 2

VEHICLE WHEEL WITH A RIM

BACKGROUND OF THE INVENTION

Field of the Invention

The present invention relates to a vehicle wheel, i.e. a pneumatic tire and wheel rim assembly, and also to a wheel rim for such a vehicle wheel.

It is known to configure a rim seating with a "hump", i.e. an elevated ridge which is spaced from the rim shoulder or flange so that, when the tire is fitted to the rim, the bead cores of the tire will be located between the elevated ridge and the rim flange. The purpose of these elevated ridges, or humps, is to enhance the firmness in which the tire is held on the rim, so that the tire is able to withstand natural forces to which it is subjected when the vehicle is turned sharply or driven under off-road conditions. This construction is often used in low profile tires, particularly extremely low profiles such as broad off-road tires.

Background Information

One example of a vehicle wheel of this kind is illustrated and described in U.S. Pat. No. 4,034,792. In this known construction, the firmness with which the tire is held against the rim has been improved by providing the sidewalls of the tire with an outwardly projecting ridge, which engages around the rim flange so as to provide an additional holding force. This known vehicle wheel has a so-called 5° rim, i.e. a rim in which the rim seats form an angle of $5\pm1°$ to the rotational axis of the rim. The procedure of fitting a tubeless tire to a wheel rim involves a number of steps. Firstly, one tire bead is forced over one rim flange or shoulder and then pressed mechanically in towards the opposite rim flange. The other tire bead is then also forced over said one rim flange, whereafter the tire is inflated so that both tire beads will be pressed outwardly towards respective rim flange, such that the bead cores are located between the rim lips and the elevating ridge. One problem encountered when fitting the tire is that the tire has difficulty in accommodating the air delivered to the tire, in other words, the air leaks from the tire between tire bead and rim seat, due to unsatisfactory contact between tire bead and rim seat. This problem is mostly caused when the tire has been stored incorrectly, so that prior to being fitted the distance between the beads of the tire is considerably shorter than the corresponding distance when the tire has been fitted and inflated. Another problem that can occur when fitting the tire to the rim is that the tire beads may snap past the elevated ridges. In the case of this known vehicle wheel, one elevating ridge has sloping sides and the other ridge has a very broad crown which is inclined at a smaller angle than the bottom of the circumferential groove, i.e. the actual rim seat. It can therefore be difficult to push the tire bead over this broad ridge, when fitting the tire.

U.S. Pat. No. 3,915,215 illustrates another example of a vehicle wheel comprising a 5° rim provided with an elevating ridge or hump. In the case of this known vehicle wheel, the tire beads are constructed so that the beadheels and the tread cores are located between the rim flange and elevated ridge, whereas the tiretoe lies inwardly of the elevated ridge, i.e. on the side of the ridge that is distal from the rim flange. This arrangement also provides additional locking of the tire beads so as to better prevent the tire bead from sliding away from the rim flange when the tire is subjected to powerful lateral forces, i.e. when negotiating curves and when driving under off-road conditions. A tire of this known kind is also fitted to the rim in the manner aforedescribed.

As before mentioned, a 5° rim is used in vehicle wheels taught by the aforesaid U.S. publications. The problems encountered when fitting tires to rims in which the rim seats are inclined at such a small angle are not equally pronounced in the case of so-called 15° rims, i.e. rims in which the rim seats form an angle of $15°\pm1°$ to the rotational axis of the rim.

It is also known to use an elevated ridge on rim seats that are given a slope of 15° in order to improve the firmness by which the tire is held to the rim. For instance, Swedish published specification SE-B-436 721 teaches a vehicle wheel comprising a tire of standard profile, wherein the rim seats are inclined at 15°. In this case, the ridges are very short and are provided with a generally radial abutment surface which faces towards the rim lips. However, it is far more difficult to fit a tire onto a rim of this kind than when using rims in which both rim seats are angled at 5°, and all of the problems that exist with 5° rims still remain, and in certain cases are even amplified.

OBJECTS OF THE INVENTION

An object of the present invention is to provide a vehicle wheel and a wheel rim respectively, with which the tire can be fitted more easily despite the use of a 15° rim.

Another object is to provide a vehicle wheel and a wheel rim respectively in which the rim seats are so designed that the tire will seal against the rim seats at an earlier stage than with known vehicle wheels and rims respectively, thereby facilitating fitting of the tire.

SUMMARY OF THE INVENTION

These and other objects are achieved when the vehicle wheel and the wheel rim respectively are constructed in the manner defined in Claim 1 and in Claim 6. Other advantageous embodiments of the invention are defined in the dependent Claims.

BRIEF DESCRIPTION OF THE DRAWINGS

An exemplifying embodiment of an inventive vehicle wheel and a wheel rim respectively will now be described in more detail with reference to the accompanying drawings. FIG. 2 illustrates the wheel rim in larger scale

DESCRIPTION OF THE PREFERRED EMBODIMENTS

Figure 1:
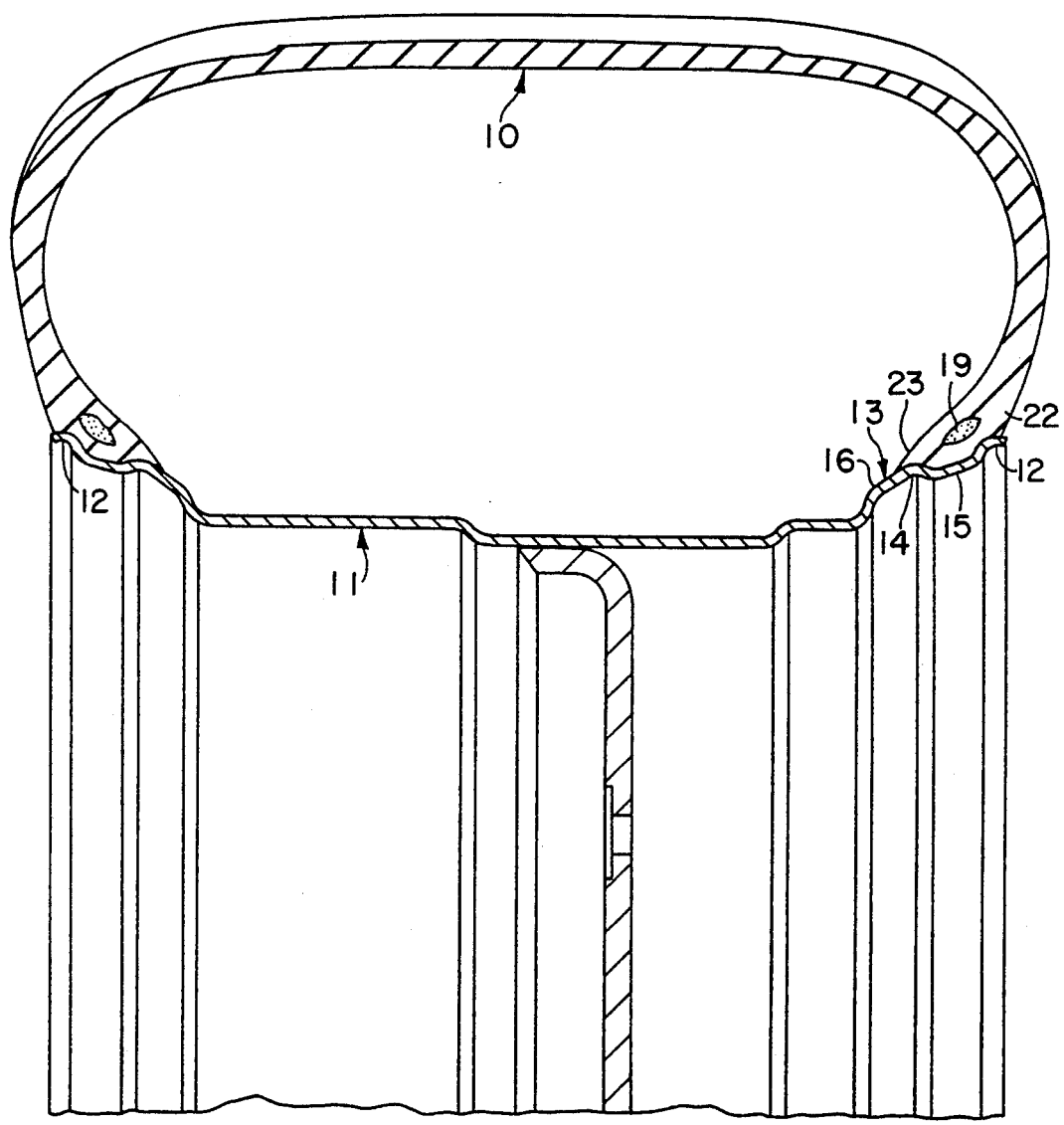
FIG. 1 is a radial sectioned view of an inventive vehicle wheel and a wheel rim respectively.

FIG. 1 illustrates a pneumatic, tubeless low-profile tire 10 fitted onto a wheel rim 11. The rim includes rim flanges 12 and rim seats 13 which lie inwardly of the flanges 12. The rim seats include an elevated ridge 14, a so-called hump, which divides the seats into two seat-parts 15, 16. As will best be seen from FIG. 2, the seat-parts 15 and 16 have a generally rectilinear configuration and are inclined at different respective angles $\alpha$ and $\beta$ to a line which extends parallel with the rotational axis of the rim and the vehicle wheel. The radial distance between the rotational axis of the rim and the vehicle wheel and the crown of the elevated ridge is smaller than the rim radius, i.e. the radial distance between the aforesaid rotational axis and the chain line 18 in FIG. 2. It has been found that a suitable vertical ridge extension (i.e. the radial distance between the ridge crown and a straight line extension of the bottom of the rim seat-part 15) is 4–8 mm, said crown lying at a distance from the rim radius line 18 which is roughly half as large. The most suitable value for each individual vehicle tire can be established by one of normal skill in this art with the aid of simple experiments. The radial distance to the crown of the elevated ridge, however, must be shorter than the radial distance between the inner periphery of the bead cores 19 of the tire in the tire beads 20 of the vehicle tire.

In accordance with a preferred embodiment of the present invention, as can be inherently divined from FIG. 2, the crown portion of elevated ridge 14 preferably defines a curve, and rim seat-part 16 preferably intersects the curve of the crown portion of elevated ridge 14 at a tangent, without a point of inflection.

The tire can be fitted much more easily when the vehicle wheel and wheel rim respectively are constructed in the aforesaid manner. This is evident from FIGS. 3–6, which illustrate movement of the tire bead 20 towards the rim flange 12 during a tire fitting operation.

Figure 3:
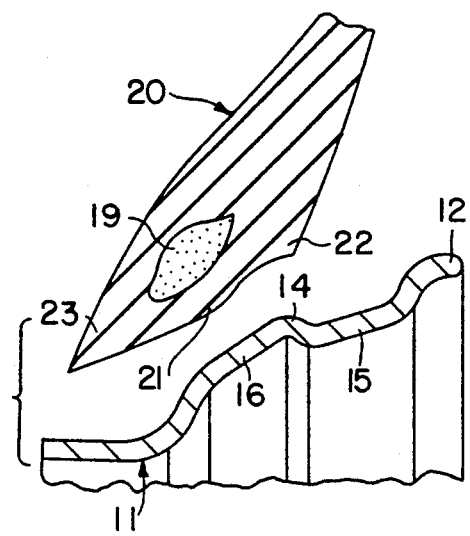
FIGS. 3–6 illustrate different stages of a tire fitting operation while displacing the tire bead out towards the rim seat and the rim flange.
Figure 4:
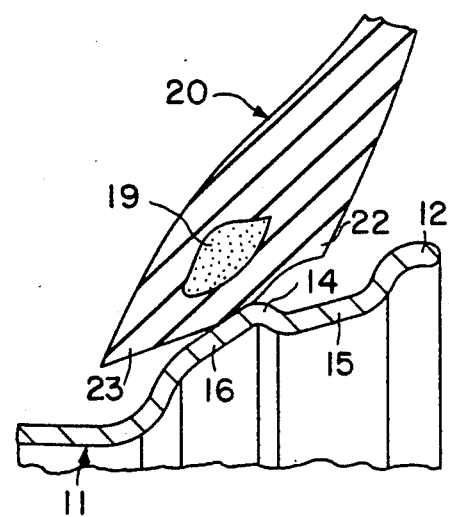
Figure 5:
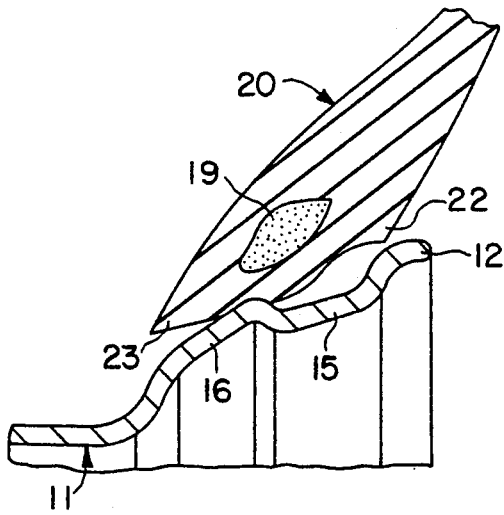
Figure 6:
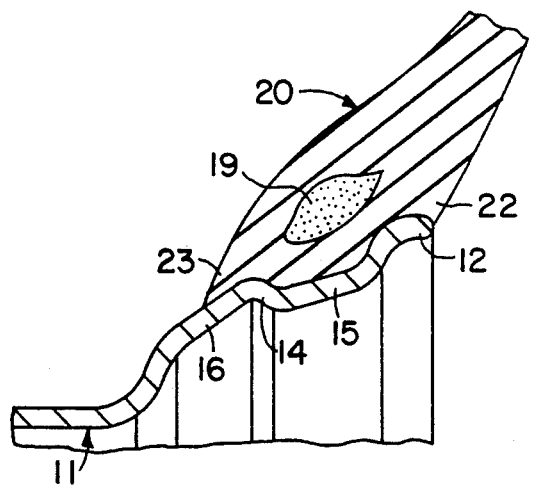

FIG. 3 illustrates the stage of a tire-fitting operation immediately prior to the tire bead coming into contact with the rim seat-part 16. Because the seat-part 16 is generally rectilinear and slopes at a greater angle than the actual rim seat, i.e. the seat-part 15, the undersurface 21 of the tire bead will come early into sealing contact with the seat-part 16 and the rim 14. The steep slope of the seat-part 16 also results in a relatively high abutment pressure, which in turn results in a high sealing effect and therewith in improved air-retaining ability during the tire-fitting operation. When the internal pressure increases as the tire is inflated, the tire bead will slide over the crown of the elevated ridge 14 (FIG. 5) while maintaining the aforesaid high sealing efficiency. Finally, the tire bead snaps out to its ultimate fitting position, as illustrated in FIG. 6, wherewith the tireheel 22 abuts the rim flange 12 and the tire toe 23 embraces the elevating ridge 14 and is also pressed sealingly against the rim seat-part 16. In total, the result is an extremely efficient seal and enhanced security against air leakage when the vehicle concerned negotiates a sharp curve or is driven under off-road conditions, even when the tire has an extremely low profile.

In the illustrated embodiment, the rim seat-part 15 is inclined at an angle $\alpha$ of 15° and the seat-part 16 is inclined at an angle $\beta$ of 34°. According to accepted standards within the field, the angle $\alpha$ may vary with ±1°. The angle $\beta$ may vary within the range of 15° to 40° within the concept of the present invention. The lower limit is preferably 20° or 25°, whereas the upper limit is preferably 35°.

Although the invention has been described and illustrated with reference to an extremely low profile tire, since such tires are often the most difficult to fit and with which the advantages afforded by the invention are therefore most noticeable, it will be understood that the invention can be applied equally as well to low profile tires of a more conventional kind and also with tires of normal profile.

I claim:

1. A vehicle wheel comprising:

a wheel rim and a tire fitted on said wheel rim;
said tire comprising a pair of tire beads;
said wheel rim comprising a pair of rim flanges, each said rim flange being disposed about a periphery of said wheel rim;
each said rim flange comprising a rim seat for receiving a corresponding one of said tire beads;
each said rim seat comprising an elevated ridge spaced apart from a corresponding one of said rim flanges;
said wheel rim comprising a pair of seat surfaces, each of said seat surfaces being disposed between a corresponding one of said rim flanges and a corresponding one of said elevated ridges;
each said elevated ridge being configured to divide its corresponding seat surface into two seat portions;
a first of said two seat portions of each said seat surface being disposed between the corresponding elevated ridge and the corresponding rim flange;
said vehicle wheel being configured to rotate about a rotational axis;
said first seat portion being oriented at an angle of about 15° with respect to the rotational axis of said vehicle wheel;
a second of said two seat portions of each said seat surface being disposed on a side of the corresponding elevated ridge away from the corresponding rim flange;
said second seat portion being oriented at an angle of between about 15° and about 35° with respect to the rotational axis of said vehicle wheel;
each said elevated ridge comprising a crown portion, each said crown portion representing a maximum protrusion of each said elevated ridge;
said second seat portion extending rectilinearly in an inward direction away from said crown portion;
each said tire bead comprising a tire toe; and
each said tire toe being disposed to:
  embrace and surround each said elevated ridge; and
  be engaged with and sealingly pressed against each said second seat portion.

2. The vehicle wheel according to claim 1, wherein:
said crown portion of each said elevated ridge defines, at the maximum protrusion of each said elevated ridge, a first radius with respect to the rotational axis of said vehicle wheel;
each said first seat portion has a first edge portion, defined along each said rim flange, and a second edge portion, defined along each said elevated ridge;
each said first seat portion extends between said first edge portion and said second edge portion;
each said first seat portion defines, at said second edge portion, a second radius with respect to the rotational axis of said vehicle wheel;
said first and second radii are defined perpendicular to the rotational axis of said vehicle wheel; and
said second radius is greater than said first radius.

3. The vehicle wheel according to claim 2, wherein each said first seat portion extends rectilinearly between said first edge portion and said second edge portion.

4. The vehicle wheel according to claim 3, wherein:
said crown portion of each said elevated ridge defines a curve; and
each said second seat portion intersects the curve of each said crown portion of each said elevated ridge at a tangent, without a point of inflection.

5. The vehicle wheel according to claim 4, wherein:
said wheel rim has a central medial plane defined therethrough, said central medial plane being perpendicular to the rotational axis of said vehicle wheel;
each said tire bead comprises a bead core;
each said bead core being disposed substantially fully within each said tire bead; and
when said tire is fitted on said wheel rim, each said bead core is offset from said elevated ridge in a direction outwardly of the central medial plane of said wheel rim.

6. The vehicle wheel according to claim 5, wherein said second seat portion is oriented at an angle of between about 20° and about 35° with respect to the rotational axis of said vehicle wheel.

7. The vehicle wheel according to claim 6, wherein:
said second seat portion is oriented at an angle of about 35° with respect to the rotational axis of said vehicle wheel.

8. The vehicle wheel according to claim 7 wherein each said seat portion is oriented at an angle of 15°-1° with respect to the rotational axis of said vehicle wheel.

9. The vehicle wheel according to claim 8, wherein:
said wheel rim is a drop-center rim;
the maximum protrusion of each said elevated ridge, in a radial direction with respect to the rotational axis of said vehicle wheel, is between essentially 4 millimeters and essentially 8 millimeters; and
said tire is a low-profile pneumatic tire.

10. A wheel rim for a pneumatic tire, wherein the pneumatic tire comprises a pair of tire beads, each of the tire beads comprising a tire toe, and wherein said wheel rim is configured for rotating about a rotational axis, said wheel rim comprising:
a pair of rim flanges, each said rim flange being disposed about a periphery of said wheel rim;
each said rim flange comprising a rim seat for receiving a corresponding tire bead;
each said rim seat comprising an elevated ridge spaced apart from a corresponding one of said rim flanges;
said wheel rim comprising a pair of seat surfaces, each of said seat surfaces being disposed between a corresponding one of said rim flanges and a corresponding one of said elevated ridges;
each said elevated ridge being configured to divide its corresponding seat surface into two seat portions;
a first of said two seat portions of each said seat surface being disposed between the corresponding elevated ridge and the corresponding rim flange;
said first seat portion being oriented at an angle of about 15° with respect to the rotational axis of the wheel rim;
a second of said two seat portions of each said seat surface being disposed on a side of the corresponding elevated ridge away from the corresponding rim flange;
said second seat portion being oriented at an angle of between about 15° and about 35° with respect to the rotational axis of the wheel rim;
each said elevated ridge comprising a crown portion, each said crown portion representing a maximum protrusion of each said elevated ridge;
said vehicle wheel rim being configured to rotate about a rotational axis;
a central medial plane defined through said wheel rim, the central medial plane being perpendicular to the rotational axis of said wheel rim;
said second seat portion extending rectilinearly in an inward direction, away from said crown portion and towards the central medial plane of said wheel rim;
each said elevated ridge being configured such that each tire toe embraces and surrounds each said elevated ridge when the tire is fitted on said wheel rim; and
each said second seat portion being configured to engage with and sealingly press against each tire toe when the tire is fitted on said wheel rim.

11. The wheel rim according to claim 10, wherein:
said crown portion of each said elevated ridge defines, at the maximum protrusion of each said elevated ridge, a first radius with respect to the rotational axis of said wheel rim;
each said first seat portion has a first edge portion, defined along each said rim flange, and a second edge portion, defined along each said elevated ridge;
each said first seat portion extends between said first edge portion and said second edge portion;
each said first seat portion defines, at said second edge portion, a second radius with respect to the rotational axis of said wheel rim;
said first and second radii are defined perpendicular to the rotational axis of said wheel rim; and
said second radius is greater than said first radius.

12. The wheel rim according to claim 11, wherein each said first seat portion extends rectilinearly between said first edge portion and said second edge portion.

13. The wheel rim according to claim 12, wherein:
said crown portion of each said elevated ridge defines a curve; and
each said second seat portion intersects the curve of each said crown portion of each said elevated ridge at a tangent, without a point of inflection.

14. The wheel rim according to claim 13, wherein said second seat portion is oriented at an angle of between about 20° and about 35° with respect to the rotational axis of said wheel rim.

15. The wheel rim according to claim 14, wherein:
said second seat portion is oriented at an angle of about 35° with respect to the rotational axis of said wheel rim.

16. The wheel rim according to claim 15, wherein each said seat portion is oriented at an angle of 15°-1° with respect to the rotational axis of said wheel rim.

17. The wheel rim according to claim 16, wherein:
said wheel rim is a drop-center rim; and
the maximum protrusion of each said elevated ridge, in a radial direction with respect to the rotational axis of said wheel rim, is between essentially 4 millimeters and essentially 8 millimeters.

* * * * *

UNITED STATES PATENT AND TRADEMARK OFFICE
CERTIFICATE OF CORRECTION

PATENT NO. : 5,333,661
DATED : August 2, 1994
INVENTOR(S) : Carl-Gustav Borje Christer VICTOR It is certified that error appears in the above-indentified patent and that said Letters Patent is hereby corrected as shown below:

In column 5, line 22, Claim 8, after 'of' delete "15°-1°" and insert --15°±1°--.

In column 6, line 55, Claim 16, after 'of' delete "15°-1°" and insert --15°±1°--.

Signed and Sealed this

Twentieth Day of August, 1996

Attest:

BRUCE LEHMAN

Attesting Officer

Commissioner of Patents and Trademarks